United States Patent [19]
Bertellotti et al.

[11] Patent Number: 6,068,702
[45] Date of Patent: May 30, 2000

[54] POWDER COATING APPARATUS FOR USE IN MULTIPLE POWDER COATING TECHNIQUES

[75] Inventors: Christopher Bertellotti, New Britain; Jennifer Daling, Middletown; Visveshwar Reddy, North Haven; David Seales, North Branford; Vincent Sutton, Clinton, all of Conn.

[73] Assignee: Nordson Corporation, Westlake, Ohio

[21] Appl. No.: 09/039,074

[22] Filed: Mar. 13, 1998

[51] Int. Cl.[7] .................................................. B05B 5/025
[52] U.S. Cl. ........................... 118/621; 118/629; 118/308; 118/309; 118/326; 118/DIG. 5; 118/DIG. 7
[58] Field of Search ...................... 118/621, 629, 118/308, 309, 326, DIG. 5, DIG. 7

[56] References Cited

U.S. PATENT DOCUMENTS

| | | |
|---|---|---|
| 4,084,018 | 4/1978 | Karr ............................................. 427/27 |
| 4,606,928 | 8/1986 | Dunford et al. ............................ 427/32 |
| 5,056,460 | 10/1991 | Vöhringer ................................. 118/326 |
| 5,690,450 | 11/1997 | Miller et al. ............................... 406/39 |

*Primary Examiner*—Laura Edwards
*Attorney, Agent, or Firm*—Wood, Herron & Evans, L.L.P.

[57] ABSTRACT

Apparatus for powder coating various types of parts using different powder coating techniques. The apparatus includes a powder coating hood in which the coating operation takes place and a powder collection booth connected to the hood for drawing air and excess powder out of the hood. An air circulation system is provided in the collection booth for drawing excess air and powder from the hood. An air flow regulator is provided to adjust the draw of air and powder between low and high amounts. A low amount is, for example, useful for electrostatic fluidized bed coating, while a higher amount may be useful for spray coating techniques.

28 Claims, 6 Drawing Sheets

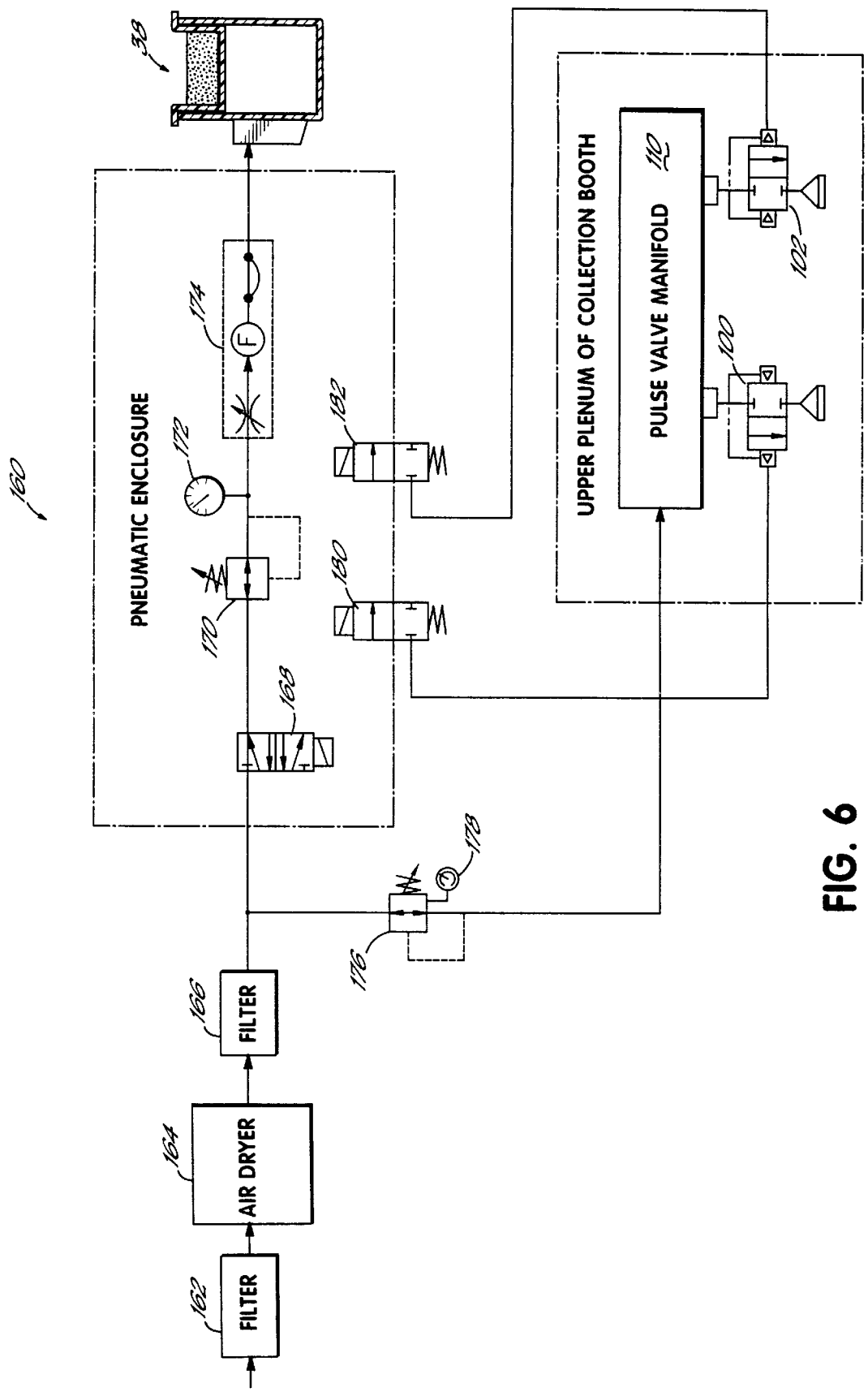

POWDER COATING APPARATUS FOR USE IN MULTIPLE POWDER COATING TECHNIQUES

FIELD OF THE INVENTION

The present invention generally relates to powder coating systems and, more particularly, to fluidized bed and powder spray coating technology.

BACKGROUND OF THE INVENTION

Powder coating technology has generally evolved over several years into several different coating techniques performed with various types of apparatus. With each technique and apparatus, a powder, such as a resinous polymer or paint, is initially adhered to a desired object or part generally in a uniform thickness. The initial powder coating is then cured using heat or other techniques, such as infrared or ultraviolet light, to fully adhere the coating to the part.

Conventional techniques for initially adhering the powder particles to the part before curing have included three general types. Two general techniques involve the use of fluidized powder beds. In the first technique, the part is heated and then dipped into a fluidized bed of powder particles. The particles partially coalesce or tackify and thereby stick to the part. The second technique involves electrostatically charging the powder particles eminating in a cloud from a fluidized powder bed. When an electrically conductive, but grounded part is placed within the eminating cloud of electrostatically charged powder particles, the charged particles will be attracted to the outer surfaces of the part. The grounded part may be manually placed within a powder coating hood containing the electrostatically charged powder cloud or may be on a conveyor system which moves parts continuously through the hood or chamber. A third general technique for powder coating parts also involves electrostatic charging of powder particles. However, this technique utilizes a spray gun which may emit the powder particles from the gun while electrostatically charging those particles at the gun nozzle or may emit a stream of powder particles using air which has previously been electrostatically charged. In this technique, the parts to be coated are again grounded and are typically contained within a spray coating hood to contain and collect excess sprayed powder. The three general techniques described above may also have many variations.

Each of the above described powder coating techniques has different advantages and limitations. Spray coating techniques are often desired to allow the user to exert more direct control during the coating process or to allow coating in a touch-up manner. Conventional techniques that involve dipping heated parts into fluidized powder beds are the simplest form of powder coating since no electrostatic charging is necessary. Finally, electrostatic fluidized beds also involve relatively simple apparatus and may be desirable for parts having simple geometric shapes and structures or for continuous processes.

Air circulation systems are advantageously employed to draw excess powder and air out of the powder coating area of an operating hood or chamber associated with the particular coating method. Conventional techniques requiring heated parts and lightly fluidized beds of powder may not require an air circulation system, depending on the application. Spray coating techniques require a relatively high draw of air from the operating hood to collect the more significant excess amounts of powder sprayed from the gun. Electrostatic, fluidized bed techniques typically employ an air circulation system that more precisely draws lower amounts of air and powder from the operating hood to create the most effective cloud of charged powder. This cloud should not significantly exit the hood toward the operator but also cannot be suctioned out of the hood to such an extent that the charged powder cloud does not adequately form. In short, the electrostatically charged powder cloud should be sufficiently large and dense enough to facilitate quick, uniform and sufficient coating of the part.

Due, for example, to the varying requirements of different powder coating techniques, apparatus suitable for combined capabilities in these areas is problematic. It would be advantageous to provide powder coating apparatus which, for example, combines the benefits of fluidized bed-type apparatus and spray coating apparatus in a system which may be easily adapted for such different powder coating techniques.

SUMMARY OF THE INVENTION

The present invention therefore provides powder coating apparatus capable of converting between different powder coating requirements, such as between a fluidized bed coating system and a powder spray coating system. The fluidized bed coating system may be one or both of the fluidized bed systems described above. That is, a heated part may be dipped into a fluidized bed of powder or the fluidized bed of powder may be electrostatically charged and the part may be introduced into an electrostatically charged cloud of powder eminating from the fluidized bed.

More specifically, apparatus of the present invention preferably includes an operating hood having sides generally surrounding a powder coating area, with at least one side having an access opening to allow the introduction of a part to be coated within the powder coating area. An air circulation system is connected to the operating hood for drawing air and excess powder from the powder coating area as the part is coated. This prevents substantial portions of excess powder from exiting the hood through the access opening. An air flow regulator is incorporated into the air circulation system for controlling the draw of air and powder out of the powder coating area between a low draw amount and a high draw amount. A low draw amount, for example, may allow the hood to be used as an electrostatic, fluidized bed coating system while higher draw settings can allow the hood to be used as part of a powder spray coating system. For fluidized bed dipping techniques, the air circulation system could be turned off or set to an appropriate draw if airborne powder becomes a problem.

The air circulation system is preferably part of a powder collection booth connected to the operating hood by an air and powder pathway. The air circulation system includes an air mover, which may be a motorized blower assembly. The air mover draws air and powder out of the powder coating area through the air and powder pathway and into a collection area of the powder collection booth. An air flow regulator, preferably in the form of an adjustable baffle structure, is operatively connected to the air and powder pathway for regulating the rate at which powder and air are drawn out of the powder coating area. A powder fluidizing bed may be disposed on a floor of the operating hood and includes a powder holding area, such as a tray, for receiving and fluidizing powder coating material. The powder fluidizing bed may be used for either of the two types of fluidized bed coating techniques discussed above. In the case of an electrostatic, fluidized bed, an electrostatic charging device is operatively connected to the fluidizing bed for charging powder particles eminating from the powder holding area or tray. In the case of the more basic technique of dipping a heated part into a fluidized bed, a lower portion of the hood, including the powder tray and/or the floor as examples, may be used as a dipping bed. In this case, the same fluidizing device or an additional fluidizing device may be used to fluidize the bed sufficiently to allow parts to be dipped and initially coated therein.

In the apparatus which is currently most preferred, the powder collection booth is connected adjacent the operating hood and an opening or aperture is formed between the operating hood and the powder collection booth. The baffle assembly or structure includes a movable plate which is mounted in an adjustable fashion so as to control the size of the opening or aperture and thereby control air and powder movement into the powder collection booth. The powder collection booth further includes a collection container connected at the bottom of the booth, while the blower assembly draws air into a plenum located at the top of the booth. In this regard, the air is preferably drawn through one or more filters located in the powder collection area prior to being exhausted from the booth. The filters may further include purging devices, such as pulse air valves, which are used periodically to clean or purge the filters of powder. The purged powder falls into the collection container.

While many advantages may be attributed to the invention, one of the most notable advantages is the ease at which the apparatus may be converted between a fluidized bed apparatus and a powder spray coating apparatus. The apparatus may therefore be set up by the manufacturer or the user as one or more of the above described types of powder coating systems. These and other objects and advantages of the invention will become more apparent to those of ordinary skill in the art upon consideration of the following detailed description of the preferred embodiments taken in conjunction with the accompanying drawings.

BRIEF DESCRIPTION OF THE DRAWING

FIG. 6 is a schematic diagram of the pneumatic control system associated with the preferred apparatus.

DETAILED DESCRIPTION OF THE PREFERRED EMBODIMENTS

Figure 1:
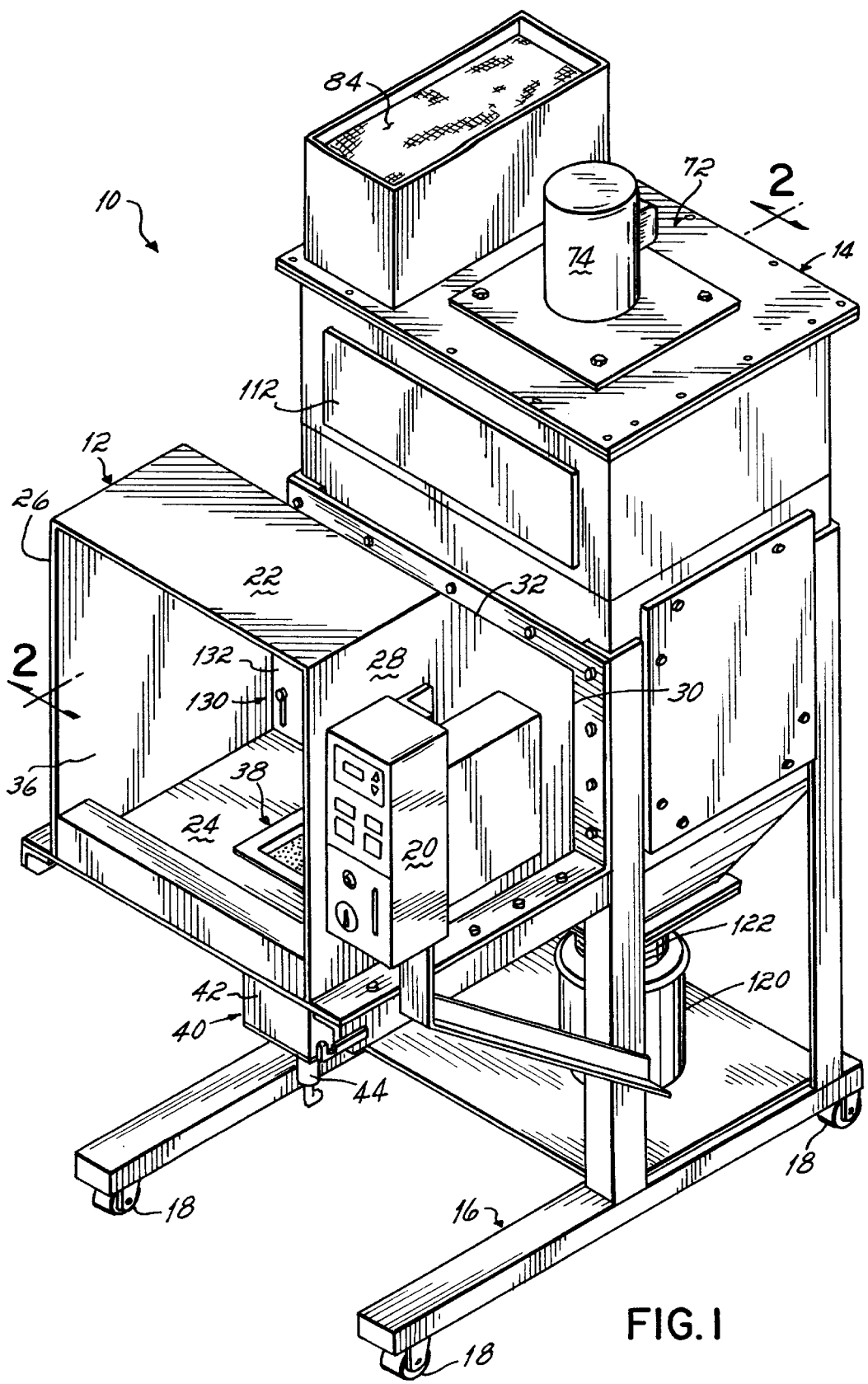
FIG. 1 is a front perspective view of a powder coating apparatus constructed in accordance with one preferred embodiment of this invention.
Figure 2:
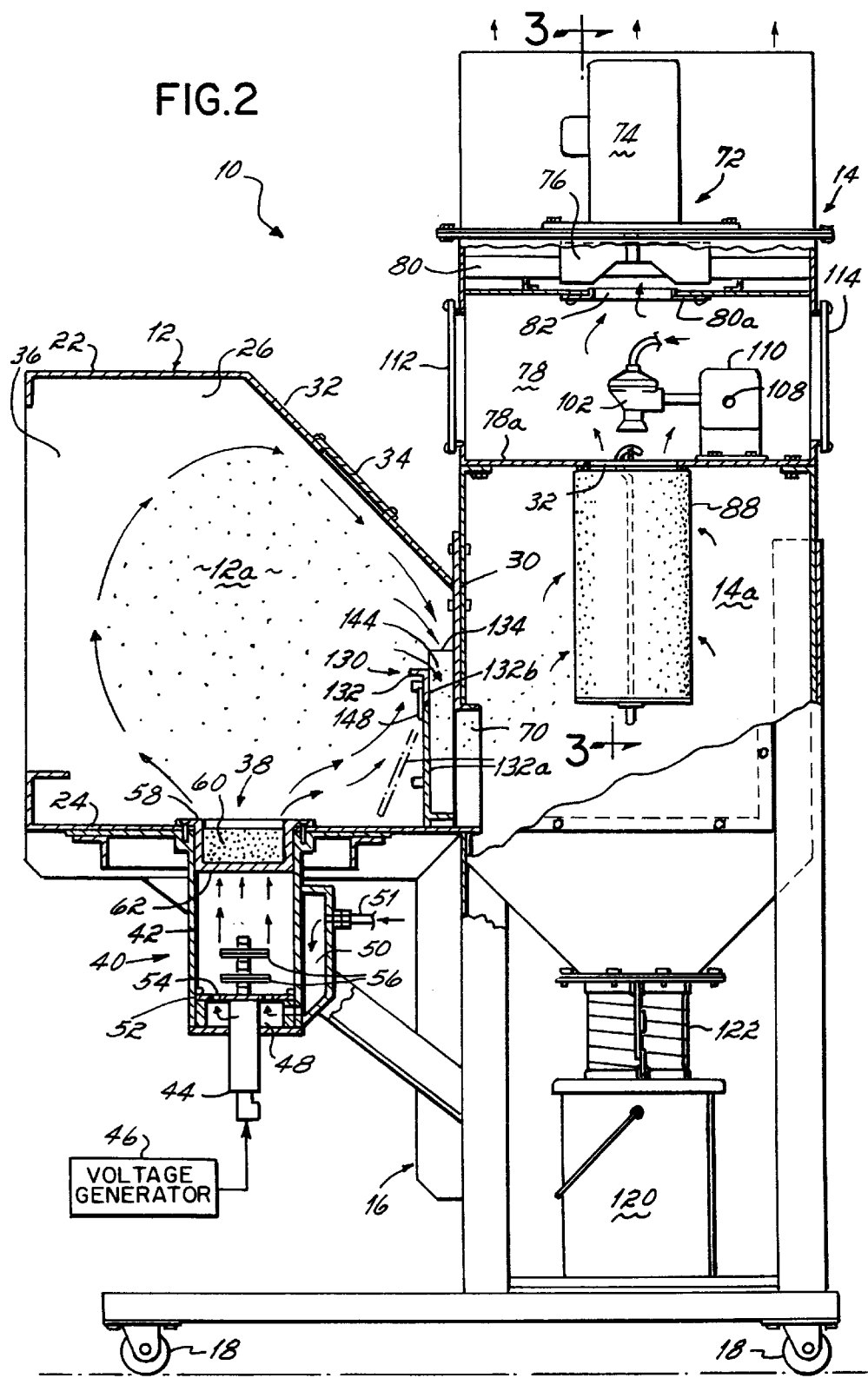
FIG. 2 is a cross sectional view taken generally along line 2—2 of FIG. 1.

Referring first to FIGS. 1 and 2, a powder coating apparatus 10 constructed in accordance with the invention generally includes an operating hood 12 and a powder collection booth 14. Operating hood 12 and powder collection booth 14 are preferably mounted on appropriate frame structure 16 which may include wheels 18 for allowing apparatus 10 to be moved to a desired location by the user. Controls 20, including both pneumatic and electrical controls may be mounted to hood 12, as shown, or may be mounted at another suitable location depending, for example, on the specific design of hood 12. Operating hood 12 more specifically includes a top 22, a bottom or floor 24, and side walls 26, 28, 30. A slanted wall 32 including a window 34 is preferably located on the back side of hood 12. Window 34 allows additional light into hood 12. An open side 36 is provided at the front for allowing the user to introduce and remove parts to be coated using either fluidized bed or spray coating techniques, or both techniques, as will be further discussed below Although not specifically shown in the drawings, a pair of side walls may include openings to allow a conveyor system to move continuously through hood 12. For example, controls 20 may be located below hood 12 and walls 26, 28 may include openings for receiving conveyed parts. In such a case, open side 36 may be closed off by a wall structure. Of course, other hood designs may be used as well.

As best shown in FIG. 2, a powder fluidizing bed 38 is preferably provided on floor 24 of hood 12. For allowing powder particles to be electrostatically charged, fluidizing bed 38 may be connected to an ionization chamber 40 comprising an enclosure 42 and an electrode assembly 44. Such an assembly may be, for example, of the type disclosed in U.S. Pat. No. 4,084,018, assigned to the assignee of the present invention, and the disclosure of which is incorporated herein in its entirety by reference. Electrode assembly 44 is generally connected to a voltage generator 46. This electrode assembly 44 extends through a lower air plenum 48 which receives pressurized air from another air plenum 50 connected to a suitable pressurized air source by way of a conduit 51. A plate 52 defines an upper side of air plenum 48 and includes a circular array of holes 54 which inject air past clusters 56 of wire bristles connected with electrode assembly 44. Clusters 56 thereby electrostatically charge the air. The air then passes into a powder holding area of bed 38. This powder holding area is preferably in the form of a tray 58 which holds powder 60 at a depth of about 1–2 inches. A lower plate 62 of tray 50 is formed of a porous material in a conventional manner.

Figure 3:
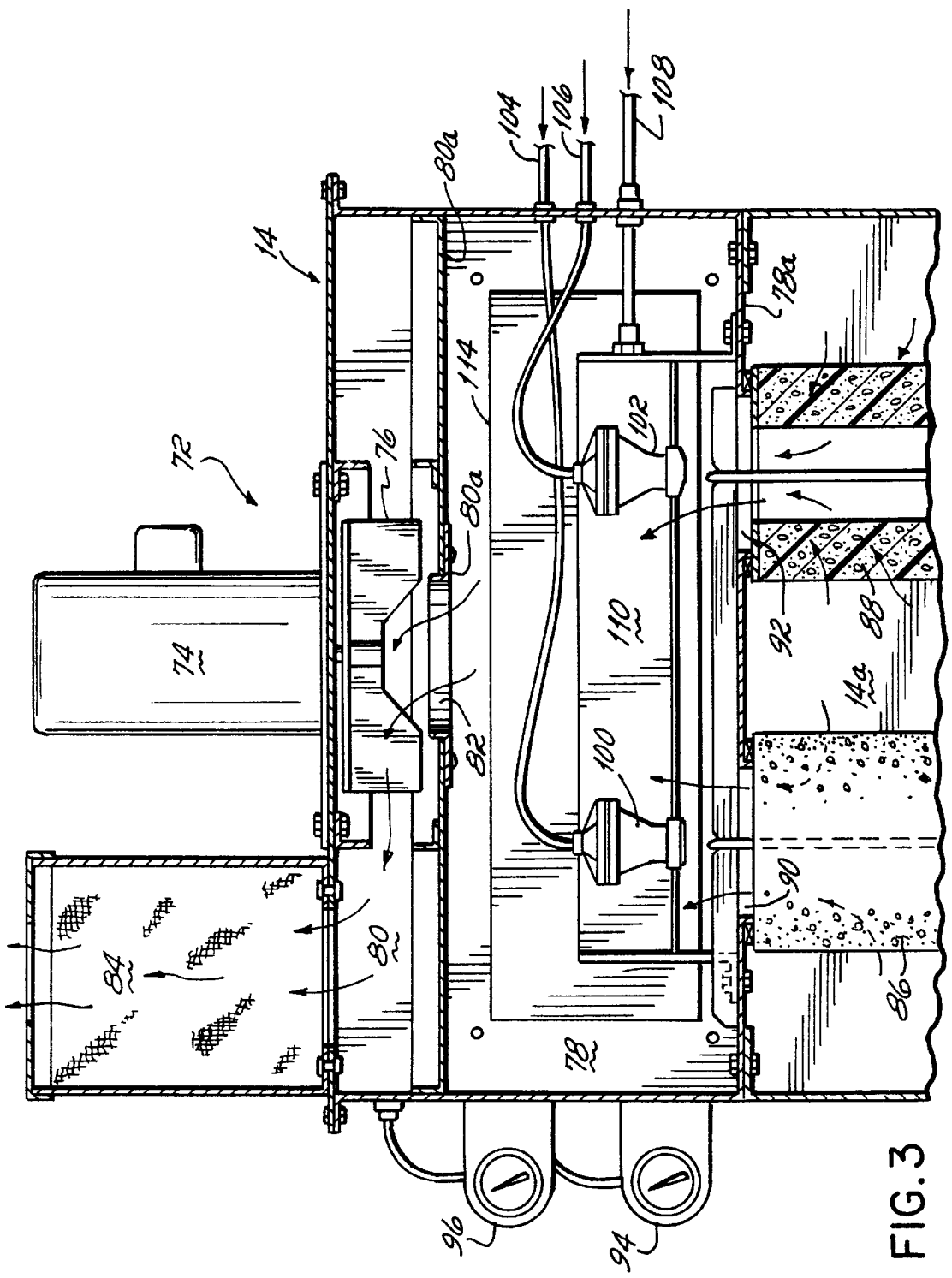
FIG. 3 is a cross sectional view taken generally along line 3—3 of FIG. 2.

An air and powder pathway 70 is provided between operating hood 12 and powder collection booth 14. A blower assembly 72 mounted to the powder collection booth 14 draws powder and air from the powder coating area 12a of booth 12 through air and powder pathway 70 and into powder collection area 14a of powder collection booth 14. Blower assembly 72 preferably comprises a motor 74 which rotates an impeller 76 to draw air into a first plenum 78 and subsequently into a second plenum 80. An aperture 82 is provided in line with impeller 76 within a plate 80a defining a lower portion of plenum 80. Air is exhausted from booth 14 through a filter 84 as best shown in FIG. 3. Air is initially drawn into plenum 78 through a pair of cartridge filters 86, 88 connected in line with a respective pair of apertures 90, 92 contained in plate 78a as shown in FIG. 3. Cartridge filters 86, 88 filter out powder entering area 14a before it reaches plenums 78, 80. Filter 84 provides a further measure of protection against any powder exiting powder collection booth 14. As further shown in FIG. 3, a pair of pressure gauges 94, 96 are preferably provided to display the differential pressure across filters 86, 88 to indicate a clogged condition. Gauge 96 may be connected to plenum 80 while gauge 94 may be connected to ambient since apparatus 10 is an open system, as opposed to one that generates a significant negative pressure in collection area 14a. Overall, the blower assembly and filters in apparatus 10 may be sized and chosen to produce an operating air flow rate of about 500 c.f.m.

Still referring to FIG. 3, a pair of pulse valves 100, 102 are mounted in line with cartridge filters 86, 88, as shown, for periodically directing pulses of pressurized air into cartridge filters 86, 88 to purge the filters of collected powder. For this purpose, a pair of control air lines 104, 106 are connected to pulse air valves 100, 102 for periodically operating the valves in an on/off, pulsing fashion. Purging air is provided by a pressurized air line 108 connected to a manifold 110 which then distributes the air to each pulse valve 100, 102. This may be done, for example, in a continuous timed manner for conveyor coating systems or as needed in manual systems. As further shown in FIG. 2, a pair of windows or access panels 112, 114 are provided for purposes of inspecting or physically accessing plenum 78 and the controls located therein. It will be appreciated that each of the plenums and panels forming powder collection booth 14 will have seams or joints which are appropriately sealed with gaskets or other sealing means so that powder collection booth may operate under a suitable negative interior pressure. A collection container 120 is provided at the lower end of powder collection booth 14 and is connected to powder collection area 14a by an appropriate conduit 122.

Figure 4:
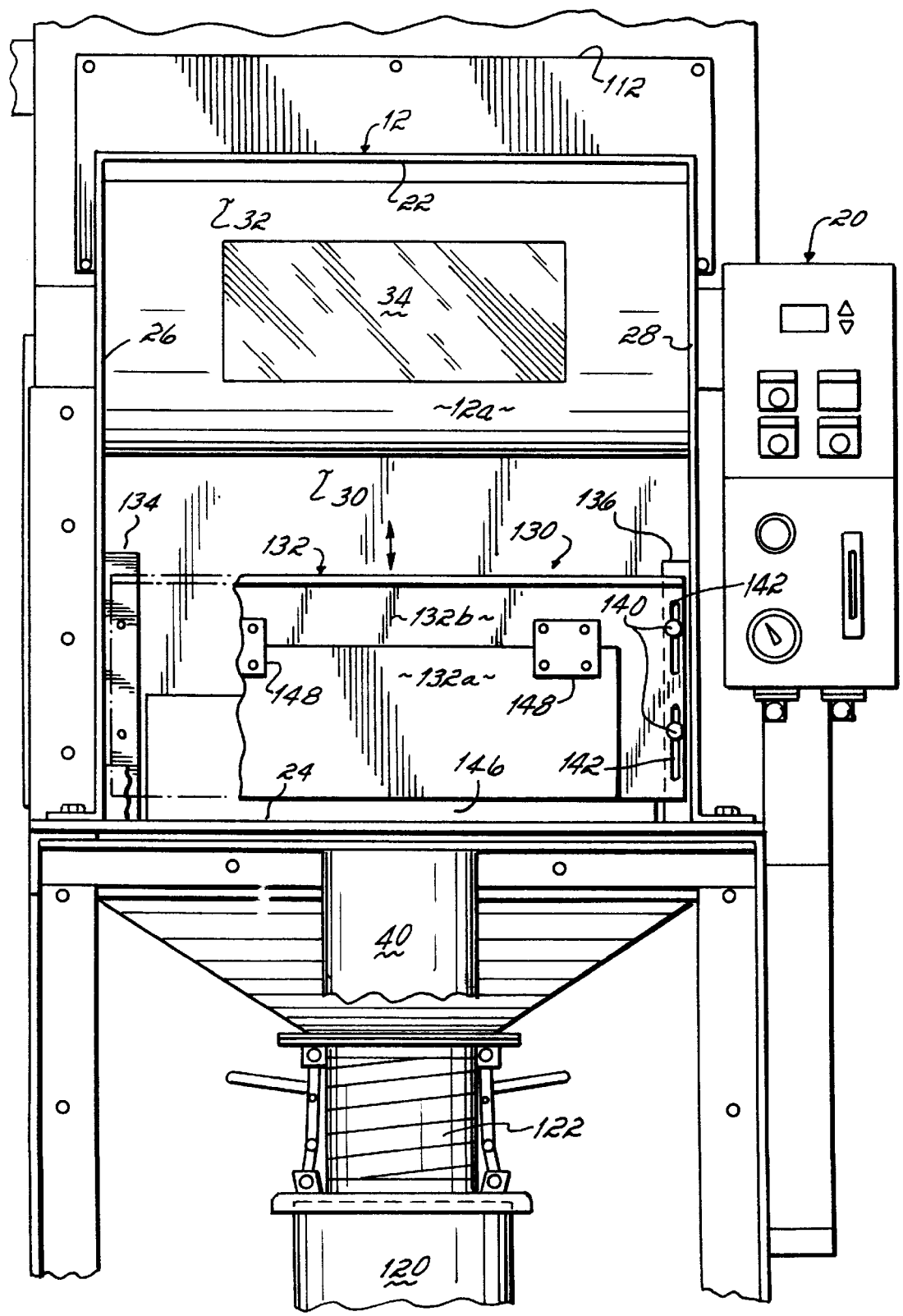
FIG. 4 is a partially fragmented front elevation of the apparatus shown in FIG. 1.
Figure 5:
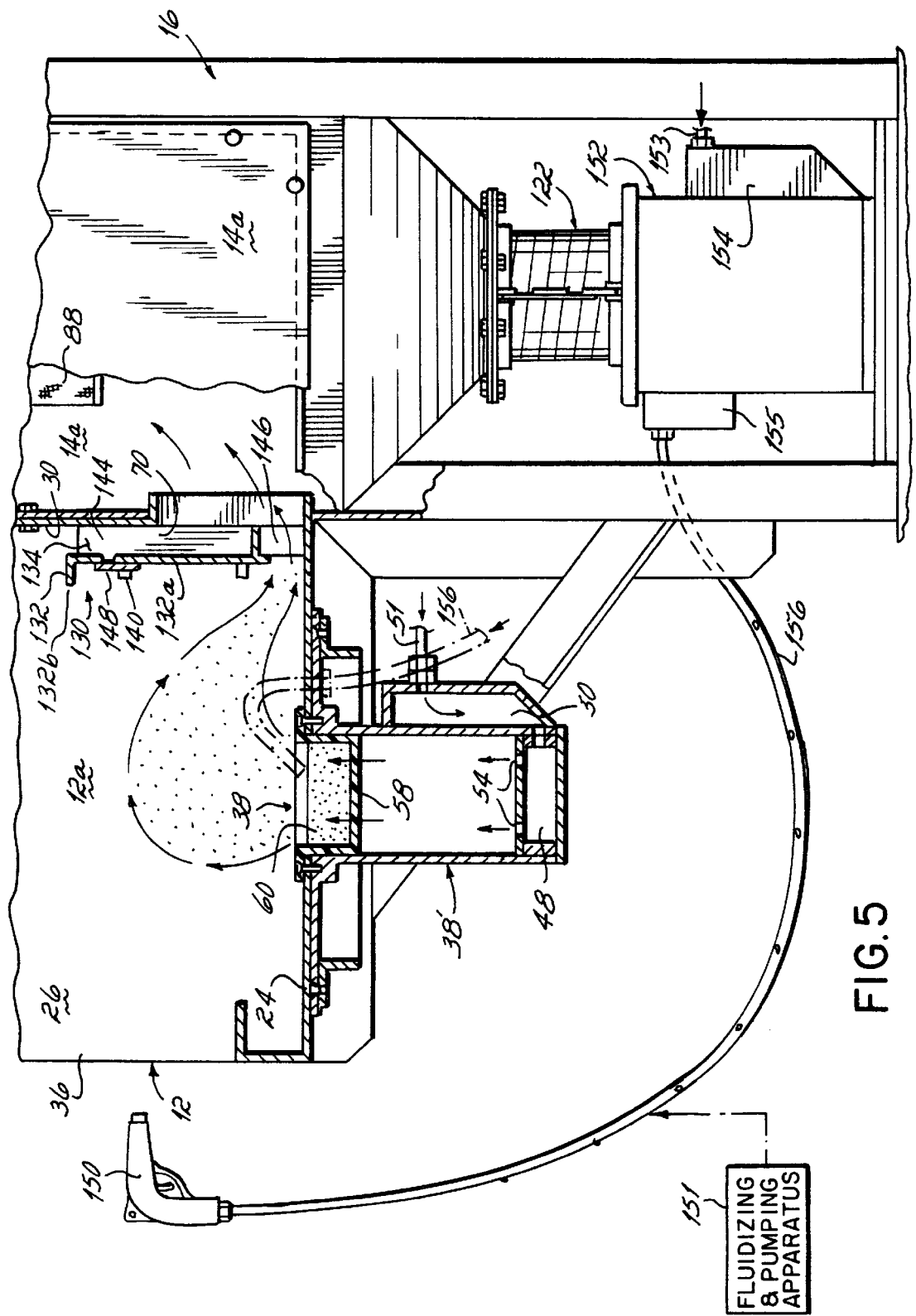
FIG. 5 is a fragmented cross sectional view similar to FIG. 2, but showing alternative powder spray coating devices connected with the apparatus.

Referring now to FIGS. 2 and 4, a baffle assembly 130 is generally disposed in air and powder pathway 70 for controlling the draw of air and powder out of powder coating area 12a between a low draw amount and a high draw amount. FIG. 2 shows baffle assembly 130 in a restrictive position corresponding to a low draw position or setting, while FIG. 5 illustrates baffle assembly 130 located in a less restrictive position corresponding to a higher draw position or setting. The position shown in FIG. 2 is more appropriate for electrostatic, fluidized bed coating techniques that require a larger, denser cloud of charged powder. The position shown in FIG. 5 is more appropriate for spray coating techniques that require significant amounts of excess, sprayed powder to be quickly collected from hood 12. Although shown in place in FIG. 5, for example, to enable dipping techniques to be used, fluidized bed 38' may be eliminated for electrostatic spray coating. Alternatively, electrostatic spray coating could be performed while also operating an electrostatic fluidized bed 38 as shown in FIG. 2.

As perhaps best shown in FIG. 4, baffle assembly 130 more specifically comprises a flow regulation plate 132 mounted in an adjustable manner to a pair of blocks or support members 134, 136 disposed at opposite sides thereof. Fastener assemblies 140 connect plate 132 to blocks 134 through slots 142 which allow plate 132 to be moved up and down, as viewed in FIG. 4. As will be apparent from a review of FIGS. 2, 4 and 5, an upper opening or spacing 144 is always present, even when baffle assembly 130 is in its most restricted position, as shown in FIG. 2. However, when plate 132 is raised as shown in FIG. 4 or 5, a lower opening 146 is additionally formed for allowing increased amounts of air and powder particles to flow from powder coating area 12a into powder collection area 14a. As further shown in FIG. 4, flow regulation plate 132 further includes a door or panel portion 132a connected by living hinges 148 to another portion 132b of plate 132. This hinged panel 132a is provided for access purposes and swings only in the direction shown in phantom in FIG. 2. Therefore, during normal operating of apparatus 10, panel 132a will not open to allow passage of air and powder into collection area 14a.

As further shown in FIG. 5, apparatus 10 may be used in conjunction with a spray coating gun 150 which sprays directly through open side 36 of operating hood 12. Spray guns 150 are typically used during electrostatic spray coating where the particles are either charged before they reach the gun or charged at the nozzle of the gun. In this use of apparatus 10, a fluidizing bed 38' is shown without any electrode assembly, however, it will be understood that the electrode assembly may remain in place or fluidizing bed 38 or 38' may be completely eliminated for spray coating techniques. If the electrode assembly is eliminated, but fluidizing bed 38' is incorporated, then dipping techniques may be performed either in tray 58 or in a suitable depth of powder 60 contained on floor 24. Adaptive apparatus may also be connected to hood 12 for this technique and might include different fluidizing devices.

In FIG. 5, spray gun 150 is shown as being alternatively connected to either a separate powder fluidizing and pumping apparatus 151 or to an alternative collection container in the form of powder fluidizing hopper and pump assembly 152. Apparatus 151 may be any of several conventional devices which employ means, such as vibration or air to fluidize powder, and which utilize some form of pump to direct pressurized air and powder to spray gun 150. One such apparatus is disclosed in U.S. Pat. No. 5,690,450, assigned to the assignee of the present invention, and the disclosure of which is hereby incorporated herein in its entirety by reference. Apparatus 152, for example, may comprise a conventional fluidizing hopper and pump assembly which receives pressurized air through a conduit 153 and manifold 154 to fluidize powder therein and a pump 155 to pump air and powder at elevated pressures through a hose 156. Hose 156 may be connected to spray gun 1 50 or, alternatively, may be directed back into hood 12, as shown.

FIG. 6 schematically illustrates a pneumatic control system 160 of apparatus 10. Specifically, air to be used within system 160 and apparatus 10 is first processed by conventional steps to render the air suitable for use. This includes directing the air through a filter 162 to remove dust, dirt and other contaminant particles. The air is then dried in a conventional air drying apparatus 164 and then again filtered in a filter 166 to remove oils. An air line is then directed to various pneumatic control devices associated with hood 12. These include an on/off valve 168, which may be connected to line 51 (FIG. 2). A pressure regulator 170 and associated pressure gauge 172 regulate and display the pressure of air to be directed to fluidized bed 38 (FIG. 2). This may, for example, be in the range of 20–40 psig for electrostatic fluidized bed 38. Finally, a flow meter 174 adjusts the volume of air being supplied to fluidized bed 38. This may, for example, be in the range of 100–300 c.f.h. for electrostatic fluidized bed 38. Another air line is connected to a pressure regulator 176 and associated gauge 178 for regulating and displaying air pressure being supplied to pulse valve manifold 110. This pressure will depend on the filter and application requirements. Pulse valves 100, 102 are respectively controlled in an on/off fashion by electric control valves 180, 182. These pulse valves 100, 102 are operated periodically, depending on the use characteristics of apparatus 10, to maintain cartridge filters 86, 88 in a relatively unclogged condition allowing the air circulation and pressures to be adequately maintained during operation.

The structure and operation of the preferred embodiments of this invention should be understood in accordance with the foregoing description. While the present invention has been illustrated by a description of various embodiments and while these embodiments have been described in considerable detail, it is not the intention of the Applicants to restrict or in any way limit the scope of the appended claims to such detail. As a general example, the various features of the mechanisms described herein in detail may be combined or substituted in various manners. More specifically, various types of operating hood structures, powder collectors, powder fluidizing devices, ionization or charging devices, and air flow regulators may be substituted for those shown herein without departing from the scope of the invention. Additional advantages and modifications will readily appear to those skilled in the art. The invention in its broader aspects is therefore not limited to the specific details, representative apparatus and methods as shown and described.

What is claimed is:

1. Powder coating apparatus capable of converting between at least two different powder coating systems, the apparatus comprising:

an operating hood having sides generally surrounding a powder coating area, with at least one side having an opening to allow the introduction of a part to be coated within the powder coating area, an air circulation system connected to the operating hood for drawing air from the powder coating area as the part is coated with powder, and an adjustable air flow regulator operatively connected with the air circulation system for controlling the draw of air and powder out of the powder coating area between a first draw amount and a second, higher draw amount, wherein the first draw amount allows use of the hood as one powder coating system and the second, higher draw amount allows use of the hood as another powder coating system.

2. The apparatus of claim 1, wherein the air flow regulator is an adjustable flow restrictor member disposed in an air and powder pathway leading out of the powder coating area.

3. The apparatus of claim 2, wherein the flow restrictor member is a movable plate.

4. The apparatus of claim 3 further comprising a powder collection booth connected adjacent the operating hood and including an air mover, wherein an opening is formed between the operating hood and the powder collection booth and the movable plate acts to control the movement of air and powder through the opening by the air mover.

5. The apparatus of claim 1 further comprising a powder fluidizing bed on a floor of the operating hood, the fluidizing bed having a powder holding area for receiving powder and being operatively coupled to powder fluidizing structure.

6. The apparatus of claim 5, further comprising an electrostatic charging device operatively connected to the fluidizing bed for charging powder particles eminating from the powder holding area.

7. The apparatus of claim 6, wherein the electrostatic charging device includes an electrode assembly connected to a voltage generator and disposed within an enclosure adapted to receive pressurized air so as to charge the pressurized air prior to the air contacting the powder particles.

8. The apparatus of claim 7, wherein the powder holding area is a tray having a porous bottom and wherein the pressurized, electrostatically charged air can travel through the porous bottom to fluidize powder within the tray.

9. The apparatus of claim 1, wherein the air circulation system is connected to a powder collection container for allowing powder to be recycled for use in the operating hood.

10. The apparatus of claim 1, wherein the powder collection container includes a powder fluidizing hopper and a powder pump operatively connected therewith.

11. The apparatus of claim 10, wherein a conduit connects the powder pump to a powder spray gun.

12. The apparatus of claim 10, wherein a conduit connects the powder pump to the operating hood.

13. The apparatus of claim 1 further comprising a powder spray gun connected with a powder fluidizing and pumping apparatus for spray coating parts in the operating hood.

14. Powder coating apparatus capable of converting between at least two different of powder coating systems, the apparatus comprising:

an operating hood having a generally enclosed powder coating area accessible through at least one opening in the hood for allowing the introduction of a part to be coated, a powder collector connected to the powder coating area of the operating hood by an air and powder pathway, an air mover operatively connected to the powder collector for drawing air and powder out of the powder coating area through the air and powder pathway and into the powder collector, and an adjustable air flow regulator operatively connected to the air and powder pathway for regulating the rate at which powder and air are drawn out of the powder coating area through the air and powder pathway, wherein the air flow regulator is adjustable between a first setting which produces a powder and air flow rate suitable for electrostatic powder spray coating in the hood and a second setting which produces a powder and air flow rate suitable for powder coating with an electrostatic, fluidized bed disposed in the hood.

15. The apparatus of claim 14, wherein the air flow regulator is an adjustable flow restrictor member disposed in the air and powder pathway leading out of the powder coating area.

16. The apparatus of claim 15, wherein the flow restrictor member is a movable plate.

17. The apparatus of claim 14, wherein the powder collector is a powder collection booth connected adjacent the operating hood and including said air mover, wherein an aperture is formed between the operating hood and the powder collection booth and the movable plate controls the movement of air and powder through the aperture by the air mover.

18. The apparatus of claim 14 further comprising a powder fluidizing bed on a floor of the operating hood, the fluidizing bed having a powder holding area for receiving powder and being operatively coupled to powder fluidizing structure.

19. The apparatus of claim 18 further comprising an electrostatic charging device operatively connected to the fluidizing bed for charging powder particles eminating from the powder holding area.

20. The apparatus of claim 19, wherein the electrostatic charging device includes an electrode assembly connected to a voltage generator and disposed within an air pressurizeable container of the powder fluidizing structure, the electrode assembly being disposed to charge pressurized air prior to the air contacting the powder particles during fluidization.

21. The apparatus of claim 14 further comprising a powder spray gun connected with a powder fluidizing and pumping apparatus for spray coating parts in the operating hood.

22. Powder coating apparatus comprising:

an operating hood having a top wall, a floor and a plurality of side walls generally surrounding a powder coating area, at least one of the side walls having an opening for receiving a part to be coated, a powder fluidizing bed disposed generally on the floor of the operating hood, the powder fluidizing bed having a powder holding area for receiving powder and being operatively coupled to powder fluidizing structure, a powder collector connected to the operating hood by an air and powder pathway, an air moving device operatively connected to the powder collector for drawing air and powder out of the air through the air and powder pathway and into a collection area of the powder collector, and a flow regulating, adjustable baffle structure mounted in the air and powder pathway for regulating the rate at which air and powder are drawn out of the powder coating area into the powder collection area, and wherein the baffle structure is adjustable between a first setting which produces a powder and air flow rate suitable for electrostatic powder spray coating in the hood and a second setting which produces a powder and air flow rate suitable for powder coating with an electrostatic, fluidized bed disposed in the hood.

23. The apparatus of claim 22, wherein the air and powder pathway is at least partially formed by an aperture contained in at least one wall disposed between the powder coating area and the powder collection area.

24. The apparatus of claim 23, wherein the adjustable baffle structure is mounted so as to at least partially block the aperture.

25. The apparatus of claim 22, further comprising an electrostatic charging device operatively connected to the fluidizing bed for charging powder particles eminating from the powder holding area.

26. The apparatus of claim 25, wherein the electrostatic charging device includes an electrode assembly connected to a voltage generator and disposed so as to charge pressurized air prior to the air contacting the powder particles during fluidization.

27. The apparatus of claim 22 further comprising a powder spray gun connected with a powder fluidizing and pumping apparatus for spray coating parts in the operating hood.

28. The apparatus of claim 22 further comprising at least one filter mounted between the air moving device and the powder coating area, and an air pulsing valve operatively connected with the filter for periodically purging powder from the filter.

* * * * *

UNITED STATES PATENT AND TRADEMARK OFFICE
CERTIFICATE OF CORRECTION

PATENT NO.  : 6,068,702
DATED       : May 30, 2000
INVENTOR(S) : Christopher P. Bertellotti et al.

It is certified that error appears in the above-identified patent and that said Letters Patent is hereby corrected as shown below:

Column 4,
Line 8, change "below Although" to -- below. Although --.

Claim 14, column 8,
Line 2, delete "of"

Claim 22, column 9,
Line 2, delete "air" (second occurrence) and after "the" insert -- powder coating area --.

Signed and Sealed this

Twenty-first Day of August, 2001

Attest:

NICHOLAS P. GODICI
Attesting Officer    Acting Director of the United States Patent and Trademark Office